United States Patent
Shah et al.

(10) Patent No.: US 9,550,519 B2
(45) Date of Patent: Jan. 24, 2017

(54) ACTIVE STEERING SYSTEM

(71) Applicant: FORD GLOBAL TECHNOLOGIES, LLC, Dearborn, MI (US)

(72) Inventors: Jitendra Shah, Aachen (DE); Oliver Nehls, Dearborn, MI (US); Lodewijk Wijffels, Aachen (DE); Sergio Codonesu, Aachen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 110 days.

(21) Appl. No.: 13/953,204

(22) Filed: Jul. 29, 2013

(65) Prior Publication Data
US 2013/0317700 A1    Nov. 28, 2013

Related U.S. Application Data

(62) Division of application No. 12/771,349, filed on Apr. 30, 2010, now Pat. No. 8,515,622.

(30) Foreign Application Priority Data

Apr. 30, 2009 (DE) .................. 10 2009 002 743

(51) Int. Cl.
*B62D 5/04* (2006.01)
*B62D 5/00* (2006.01)
*B62D 6/00* (2006.01)

(52) U.S. Cl.
CPC .............. *B62D 5/046* (2013.01); *B62D 5/008* (2013.01); *B62D 6/002* (2013.01); *B62D 6/007* (2013.01)

(58) Field of Classification Search
CPC ......... B62D 5/008; B62D 5/046; B62D 6/002; B62D 6/007

USPC .............................. 701/41–44; 180/443–446
See application file for complete search history.

(56) References Cited

U.S. PATENT DOCUMENTS

| | | | |
|---|---|---|---|
| 4,720,790 A | * | 1/1988 | Miki et al. ..................... 701/41 |
| 6,640,923 B1 | | 11/2003 | Dominke et al. |
| 6,832,144 B2 | | 12/2004 | Momiyama et al. |
| 7,168,520 B2 | | 1/2007 | Weeber et al. |
| 7,392,878 B2 | | 7/2008 | Ono et al. |

(Continued)

FOREIGN PATENT DOCUMENTS

| | | |
|---|---|---|
| DE | 10 2006 023 562 A1 | 11/2007 |
| DE | 10 2006 041 236 A1 | 3/2008 |
| DE | 10 2006 041 237 A1 | 3/2008 |

OTHER PUBLICATIONS

German Search Report from German Application No. DE 10 2009 002 743.2 filed Apr. 30, 2009.

(Continued)

*Primary Examiner* — Jelani Smith
*Assistant Examiner* — Donald J Wallace
(74) *Attorney, Agent, or Firm* — Jones Robb, PLLC; Raymond L. Coppiellie

(57) ABSTRACT

A method for operating an active steering system of a vehicle, in which a ratio between a wheel steer angle and a steering wheel angle specified by the driver can be modified by superimposition of a superimposition angle. The method comprises detecting an offset between a requested motor angle and an actual motor angle, and reducing the offset between the requested motor angle and the actual motor angle using a reduction rate that is selected as a function of at least one input variable specified by the driver.

9 Claims, 4 Drawing Sheets

(56) References Cited

U.S. PATENT DOCUMENTS

| | | |
|---|---|---|
| 7,676,308 B2 | 3/2010 | Klier |
| 7,962,262 B2 | 6/2011 | Kobayashi |
| 8,083,021 B2 | 12/2011 | Reinelt et al. |
| 2004/0059485 A1 | 3/2004 | Momiyama et al. |
| 2006/0021821 A1 | 2/2006 | Klier |
| 2007/0225884 A1 | 9/2007 | Klier et al. |
| 2008/0040001 A1 | 2/2008 | Ogawa et al. |
| 2008/0097670 A1 | 4/2008 | Ogawa et al. |
| 2009/0105907 A1 | 4/2009 | Yamaguchi et al. |
| 2009/0240389 A1* | 9/2009 | Nomura et al. ............... 701/29 |
| 2009/0271070 A1 | 10/2009 | Feller et al. |
| 2010/0235052 A1 | 9/2010 | Shartle et al. |
| 2010/0241314 A1* | 9/2010 | Bohm .................. B62D 7/159 701/41 |
| 2010/0332081 A1 | 12/2010 | Buering et al. |

OTHER PUBLICATIONS

Office Action dated Nov. 6, 2012 from co-pending U.S. Appl. No. 12/771,349.

Response to Office Action dated Nov. 6, 2012 from co-pending U.S. Appl. No. 12/771,349.

Examination Report issued in corresponding German Application No. 10 2009 002 743.2, dated Mar. 17, 2015.

\* cited by examiner

ACTIVE STEERING SYSTEM

This patent application is a divisional of application Ser. No. 12/771,349, filed Apr. 30, 2010, which claims priority to German Patent Application No. DE 102009002743.2, filed Apr. 30, 2009, the entire contents of each of which is incorporated herein by reference.

INTRODUCTION

The present teachings relate to an active steering system and to a method for operating an active steering system.

SUMMARY

The present teachings provide a method for operating an active steering system in a vehicle, in which a ratio between a steering wheel angle selected by the driver and a wheel steer angle can be modified by the active steering system by superimposing a superimposition angle. To modify the ratio between the steering wheel angle and the wheel steer angle, the active steering system detects an offset angle between a requested motor angle and an actual motor angle, and reduces the offset at a reduction rate selected as a function of at least one variable selected by a vehicle operator. The variable can comprise, for example, a steering wheel speed, a rack speed, an offset reduction speed, or a road wheel speed.

A method according to the present teachings can provide a gradual, gentle elimination or compensation of a deviation (or offset angle) between an actual motor angle and a desired motor angle or a setpoint value for the motor angle. The offset angle (defined herein as the angle between the actual motor angle and the desired motor angle) can be eliminated using the present teachings without the elimination being perceptible to the driver. In accordance with certain embodiments of the present teachings, an offset angle of about 275° can be eliminated without the elimination being perceptible to the driver.

According to various embodiments of the present teachings, elimination of the offset angle, referred to below as "offset compensation," can be carried out in a synchronized manner while the vehicle is being steered by the driver.

According to certain embodiments, input signals that are used for reducing or eliminating the offset angle can comprise, for example, one or more of the steering wheel speed, the wheel steer angle, and/or the vehicle speed. In certain embodiments, vehicle speed can be utilized to limit the offset compensation reduction rate, and to determine whether to do offset compensation, and a rate of offset compensation can become a function of steering wheel angle and steering wheel speed. A method according to the present teachings takes into account the way the driver is steering the vehicle (rapid steering, steering to the right or to the left, steering back to the central "straight ahead" position, etc.)

In an exemplary embodiment, for a fixed steering wheel angle (e.g., 90°), when a driver switches from a comfort mode (having, for example, a steering gear ratio of 16) to sporty mode (having, for example, a steering gear ratio of 12), the road wheel angle should change from about 90°/16° to 90°/12°. Offsets can also occur during vehicle startup. An algorithm of the active steering system in accordance with the present teachings does not allow the motor of the active steering system to compensate for (e.g., reduce) the offset angle value immediately. One method for compensation can comprise the following: When a driver steers away from center (the center being straight ahead), a motor of the active steering system can start to add extra angle in the same direction so that the vehicle wheels are rotating faster than expected but not by an amount perceived by driver. Alternatively or additionally, when a driver steers toward the center, the wheel can move slower than expected to reduce the offset.

In accordance with various embodiments, offset angle detection and compensation are only carried out if there is a request for detection of the offset angle. If an offset angle exists but there is no request for detection of the offset angle, an unmodified setpoint value is output for the motor angle.

The present teachings provide a method for operating an active steering system of a vehicle, in which a ratio between a wheel steer angle and a steering wheel angle specified by the driver can be modified by superimposition of a superimposition angle. The method comprises detecting an offset between a requested motor angle and an actual motor angle, and reducing the offset between the requested motor angle and the actual motor angle using a reduction rate that is selected as a function of at least one input variable specified by the driver.

The at least one input variable specified by the driver can comprise one or more of a steering wheel speed and a wheel steer angle, and reducing the offset can comprise reducing the offset in a manner that is synchronized with a steering operation of the driver. The superimposition angle can be provided by a motor. Detecting the offset and reducing the offset can occur only upon an external request for detection of the offset. In the absence of an external request for detection of the offset, a demanded superimposition angle can be selected as a setpoint value for the superimposition angle.

The present teachings also provide an active steering system for a vehicle, comprising: (1) a steering wheel configured to allow a driver to steer the vehicle by changing a steering wheel angle, which is configured to change a wheel steer angle of at least one wheel of the vehicle; and (2) a motor receiving a requested motor angle and outputting an actual motor angle to produce a superimposition angle that modifies a steering ratio between the steering wheel angle and the wheel steer angle. The system can be configured to reduce an offset between a requested motor angle and an actual motor angle as a function of at least one of a steering wheel speed and the wheel steer angle.

The present teachings also provide an active steering system for a vehicle, comprising: (1) a steering wheel and a steering wheel column configured to allow a driver to steer the vehicle; (2) a harmonic drive operatively connected to the steering wheel column; and (3) a motor receiving a requested offset angle and producing an actual offset angle. The motor can be configured to drive the harmonic drive to produce a superimposition angle that modifies a ratio between a steering wheel angle selected by the driver and a wheel steer angle of at least one wheel of the vehicle to reduce an offset between the requested motor angle and the actual motor angle.

The motor may not reduce the offset immediately. A motor angle can be produced by the motor and superimposed on a driver steering angle via the harmonic drive. The motor can reduce the offset when the driver steers away from center in a first direction by adding a predetermined amount of angle in the first direction so that the vehicle wheels rotate further in the first direction than requested by the driver. The motor can reduce the offset when the driver toward center in a second direction by subtracting a predetermined amount of angle in the second direction so that the vehicle wheels rotate less far in the second direction than requested by the driver. A gear ratio can exist between the motor angle and the superimposition angle, because the motor of the active steering system is connected to the steering column via the harmonic gear.

During one of vehicle start-up, vehicle initialization, or modification of certain vehicle settings, a difference between a setpoint value for the motor angle and the actual motor angle can occur, and the active steering system can mitigate the effect of steering gear ratio changes on the driver's perceived steering experience by governing actions by the motor to reduce the difference between a setpoint value for the motor angle and the actual motor angle.

The present teachings further provide an active steering system for a vehicle, comprising: (1) a difference module configured to calculate an offset angle by subtracting a measured motor angle from a demanded motor angle; (2) a rate limitation module configured to reduce the offset angle, the rate limitation module receiving a driver-selected steering angle, a reference offset angle, and a delayed offset angle, and outputting a modified offset angle; (3) an offset arbitration module configured to receive the offset angle from the difference module and a demanded motor angle, and to output a modified demanded motor angle and a delayed offset angle that can be reduced in a synchronized manner by the rate limitation module as a function of at least one of a steering wheel speed and an offset reduction rate; and (4) a state decision module configured to receive the offset angle from the difference module and a synchronization request, and to output state information to the offset arbitration module.

Certain objects and advantages of the present teachings will be set forth in part in the description which follows, and in part will be obvious from the description, or may be learned by practice of the present teachings. The objects and advantages of the teachings will be realized and attained by means of the elements and combinations particularly pointed out in the appended claims.

It is to be understood that both the foregoing general description and the following detailed description are exemplary and explanatory only and are not restrictive of the present teachings, as claimed.

The accompanying drawings, which are incorporated in and constitute a part of this specification, illustrate embodiments of the present teachings and, together with the description, serve to explain the principles of the teachings.

DESCRIPTION OF THE EMBODIMENTS

Reference will now be made in detail to embodiments of the present teachings, examples of which are illustrated in the accompanying drawings.

An active steering system (also referred to as an active front axle steering system or an active front steering ("AFS") system) makes it possible to modify a "steering" ratio of the steering wheel angle to the wheel steer angle (i.e., to the angle between a respective wheel and the roadway) by adding a superimposition angle. The superimposition angle can be provided, for example, by an actuator having an electric motor. The actuator's electric motor itself has a motor angle. A gear ratio exists between the motor angle and the superimposition angle, because the motor of the active steering system is connected to the steering column via a gear, for example a harmonic gear. In an exemplary embodiment, the motor angle is 50° and results in a 2° superimposition angle.

In an active steering system in accordance with the present teachings, the desired wheel steer angle can be calculated by a suitable algorithm. Tuning of the algorithm can be modified while driving, for example when a comfort-oriented or sporty operating mode is selected by a driver.

During start-up, initialization, or modification (e.g., changing from a comfort-oriented to a sporty operating mode, or vice versa) of certain settings, a difference between a setpoint value for the motor angle and the actual motor angle can occur. The range of possible deviation can comprise, for example, about 10° to about 360°. When a driver changes, for example, from a comfort mode to a sporty mode, the steering gear ratio can change. If the steering gear ratio changes, the same steering wheel angle will provide a different wheel steer angle or will change the wheel steer angle. If measures are not taken to mitigate the effect of steering gear ratio changes on the driver's perceived steering experience, the actuator's motor attempts to set the setpoint value for the motor angle with the electric motor at full speed. The consequence of this is that the wheel steer angle is altered without the influence of the driver and without taking into account the driver's intention regarding driving or steering, which gives the driver the impression that the vehicle is going out of control.

Figure 1:
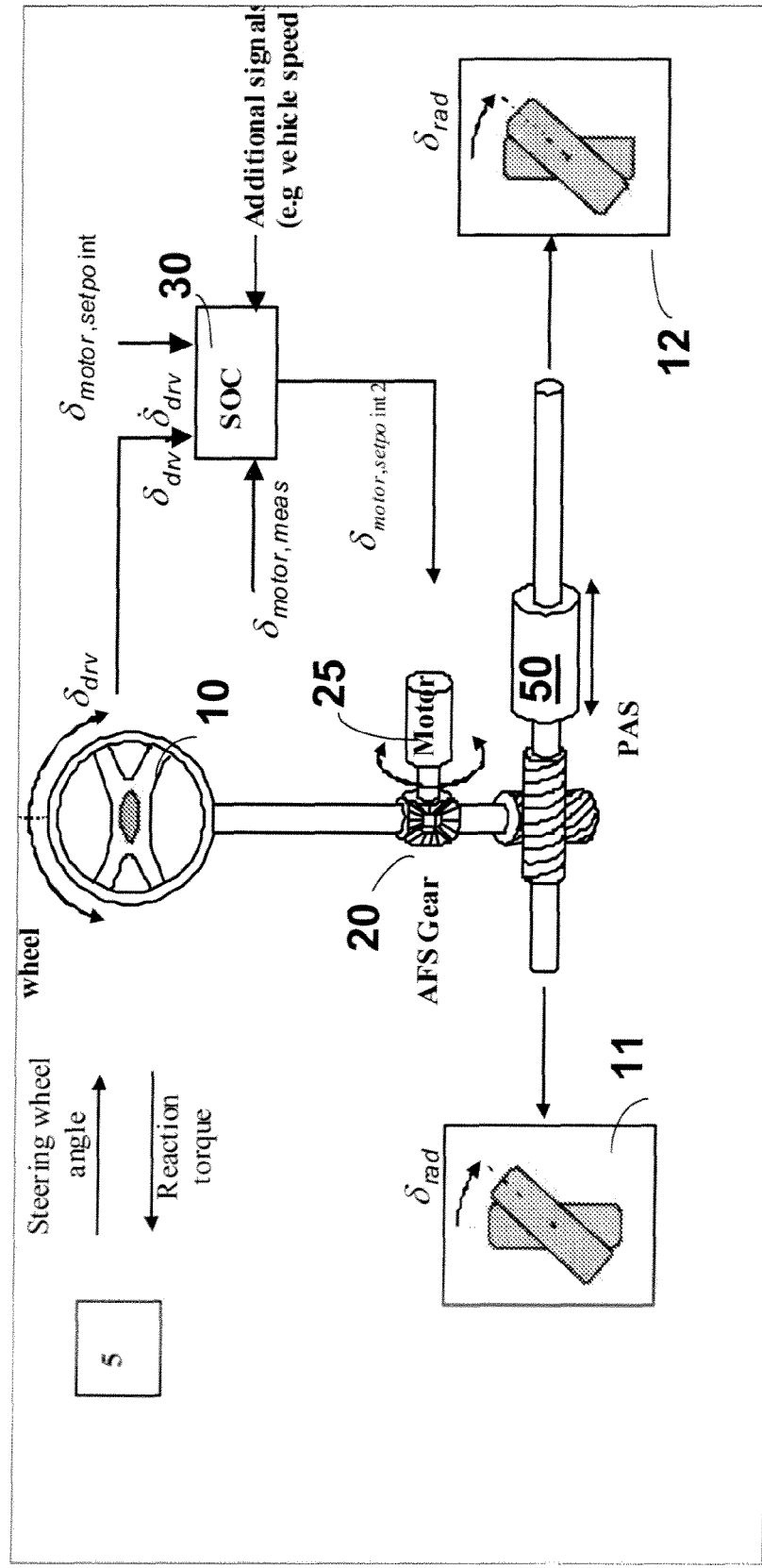
FIG. 1 is a schematic diagram of an exemplary embodiment of an active steering system in accordance with the present teachings.

FIG. 1 is a schematic diagram of an exemplary embodiment of an active steering system, in which a method according to the present teachings can be implemented. As shown, the active steering system comprises a harmonic drive 20 (also referred to as a differential or AFS gear) operatively connected to a steering wheel column for a steering wheel 10 than can be actuated by a driver 5. A superimposition angle or motor angle produced by the harmonic drive 20 can be set via an electric motor 25 (e.g., a hollow shaft motor), which sets a wheel steer angle of a left wheel 11 and a right wheel 12 to a wheel steer angle $\delta_{rad}$ produced by the active steering system. The wheel steer angle $\delta_{rad}$ can be expressed as $\delta_{rad} = \delta_{drv} + \delta_{motor}$, where $\delta_{motor}$ is a superimposition motor angle and $\delta_{drv}$ is a driver-selected steering angle.

The harmonic drive 20 can therefore add or subtract a superimposition angle or motor angle $\delta_{motor}$ to or from the driver-selected steering angle $\delta_{drv}$. The sum of the motor angle $\delta_{motor}$ and the driver-selected steering angle $\delta_{drv}$ acts on the steering gear, which produces the wheel steer.

$\delta_{drv}$ denotes a steering angle specified by the driver and $\delta_{motor}$ denotes the motor angle, which is produced by the electric motor 25 and is superimposed on the driver steering angle $\delta_{drv}$ via harmonic drive 20. As shown in FIG. 1, a hydraulic or electric power assistance system (PAS) 50 can also be provided to assist the AFS motor 25 in steering the road wheel.

The SOC block 30 detects an offset angle based on inputs such as $\delta_{drv}$, $\delta_{motor,\ meas}$, and $\delta_{motor,\ setpoint}$, and reduces the offset angle by generating a motor angle $\delta_{motor,\ setpoint2}$ that is based on inputs such as steering wheel speed and wheel steer angle, with the rate of offset angle reduction being optionally based on, for example, vehicle speed.

Offset angle, as used herein, equals the demanded motor angle (designated as $\delta_{motor}$ in FIG. 1) minus the measured motor angle (designated as $\delta_{motor,\ meas}$ in FIG. 1).

Setpoint value for the motor angle (designated as $\delta_{motor,\ setpoint2}$ in FIG. 1) equals the demanded motor angle (designated as $\delta_{motor}$ in FIG. 1) minus an angle of correction determined by the SOC block 30.

In certain embodiments of the present teachings, if there is no synchronization request, the setpoint value for the motor angle (designated as $\delta_{motor,\ setpoint}$ in FIG. 1) is equal to the demanded motor angle (designated as $\delta_{motor}$ in FIG. 1). If there is a synchronization request, the setpoint value for the motor angle (designated as $\delta_{motor,\ setpoint2}$ in FIG. 1) is equal to the demanded motor angle (designated as $\delta_{motor}$ in FIG. 1) minus the offset angle multiplied by a function F(W_SteWhl), where W_SteWhl is the steering wheel speed and function F is thus dependent, inter alia, on the steering wheel speed. F(W_SteWhl) can be a lookup table that sends out a percentage by which offset should be reduced. A resulting modified offset $y_k$ can therefore be equal to an offset angle multiplied by the value of function F(W_SteWhl).

Thus, if there is no synchronization request, the setpoint value is equal to the demanded motor angle, whereas, if there is a synchronization request, a factor dependent on the steering wheel speed and/or the wheel steer angle is included in the offset compensation.

Figure 2:
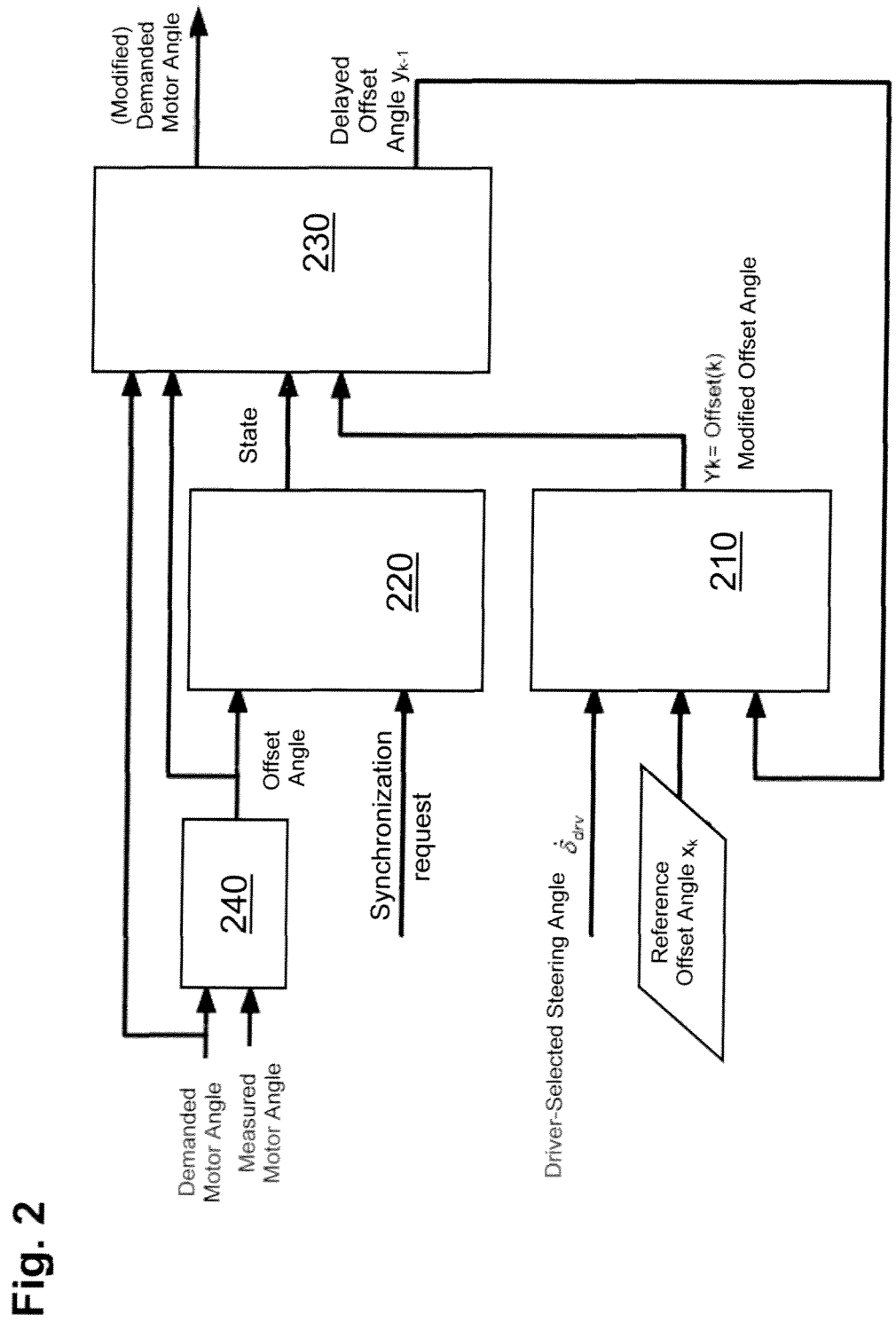
FIG. 2 shows a block diagram comprising modules of the active steering system used to carry out an exemplary embodiment of a method in accordance with the present teachings.

FIG. 2 illustrates modules used to carry out a method of the present teachings as set forth above. The modules include a rate limitation module 210 (also referred to as "rate limiter"), a state decision module 220 (also referred to as "state decision"), an offset arbitration module 230 (also referred to as "offset arbitration") and a difference module 240 (also referred to as "difference").

The main task of the rate limitation module 210 is to reduce the offset angle that occurs in the active steering system by analyzing a driver-selected steering angle $\delta_{drv}$, a reference offset angle value $x_k$, and a delayed offset angle value $y_{k-1}$. The rate limitation module 210 outputs a modified offset angle value $y_k$. The main task of the difference module 240 is to calculate the offset angle (which equals the demanded angle minus the measured angle). The offset angle value is input into the state decision module 220 and the offset arbitration module 230. The state decision module 220 can also receive a synchronization request and can output state information to the offset arbitration module 230. The offset arbitration module 230 also receives a demanded motor angle as input. The main task of the offset arbitration module 230 is to output a newly-calculated setpoint value (either the demanded motor angle unmodified or, in the case of a synchronization request, a modified demanded motor angle in accordance with calculations set forth above). The offset arbitration module 230 also outputs a modified offset angle value $y_k$, which can be reduced in a synchronized manner by the rate limitation module 210 as a function of the steering wheel speed and the offset reduction rate. The offset reduction rate R utilized by the rate limiter 210 can be calculated as follows:

$$R = \frac{x_k - y_{k-1}}{t_s}$$

with the boundary condition $R_{low} < R < R_{high}$ where $x_k$ is the setpoint offset angle, $t_s$ is the sample time, $y_k$ is the current offset value, and $y_{k-1}$ is a delayed offset value (e.g., delayed by one sample step).

The reference offset angle or setpoint offset angle value $x_k$ is input to the rate limitation module 210, and a modified offset angle value $y_k$ is output therefrom. The delayed offset angle value $y_{k-1}$ is an output variable of the preceding step in the offset arbitration module 230. The offset reduction rate R is then limited accordingly, and the calculation for the next output step is carried out as follows:

$y_k = t_s \cdot R_{high} + y_{k-1}$ if $R > R_{high}$ $y_k = t_s \cdot R_{low} + y_{k-1}$ if $R < R_{low}$ $y_k = x_k$ if R is between $R_{high}$ and $R_{low}$ wherein $t_s = t_k - t_{k-1}$ denotes a fixed sampling time.

The above equations are implemented to cover steering to the right and steering to the left. $R_{high}$ and $R_{low}$ can be tuned by, for example, an engineer during an algorithm development phase.

Figure 3:
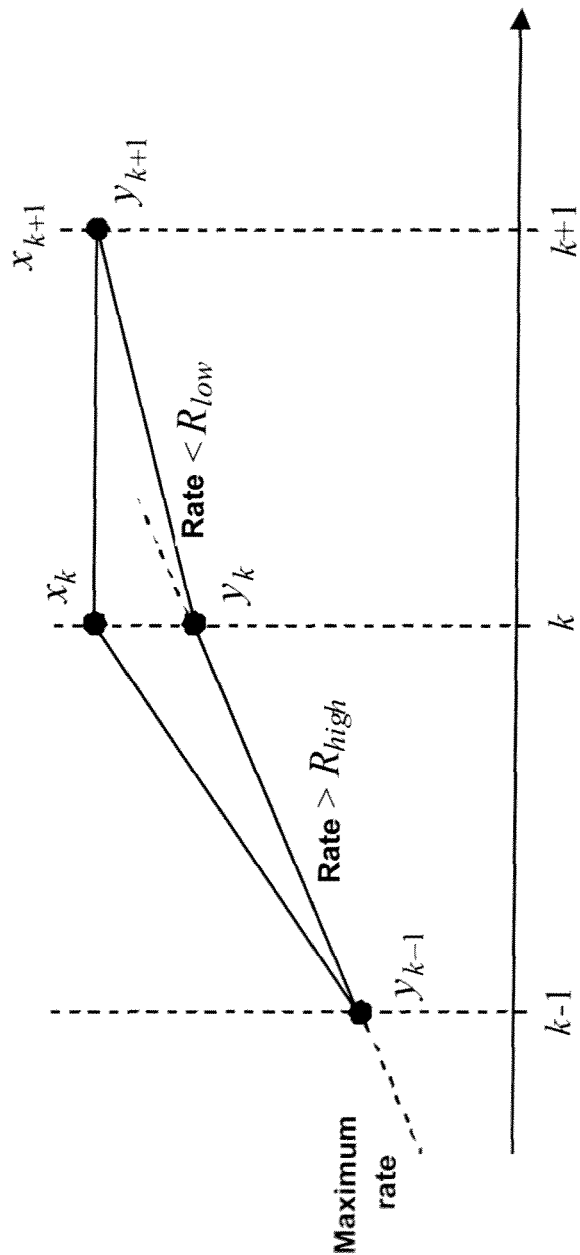
FIG. 3 is a graph illustrating operation of the rate limitation module of FIG. 2.

FIG. 3 illustrates how the value of the current offset angle $y_k$ can be changed to achieve the setpoint value as $x_k$ in accordance with the equations set forth above.

In the embodiment described above, the rate limitation algorithm was designed in such a way that only the offset angle value was stored. The equations set forth below illustrate that a rate limitation method in accordance with the present teachings can have an offset angle value $y_k$ that is decoupled from the rate limitation method explained above. If $y_k = x_k - \Delta_k$, then $$R = \frac{x_k - y_{k-1}}{t_s} = \frac{x_k - (x_{k-1} - \Delta_{k-1})}{t_s} = \frac{x_k - x_{k-1}}{t_s} + \frac{\Delta_{k-1}}{t_s}$$

The output equations also change, with y being replaced by x and $\Delta$ so that, if $R > R_{high}$:

$x_k - \Delta_k = t_s \cdot R_{high} + x_{k-1} - \Delta_{k-1}$.

From this it follows that: $\Delta_k = \Delta_{k-1} + x_k - x_{k-1} - t_s \cdot R_{high}$ and if $R < R_{low}$: $x_k - \Delta_k = t_s \cdot R_{low} + x_{k-1} - \Delta_{k-1}$ and it follows that:

$\Delta_k = \Delta_{k-1} + x_k - x_{k-1} - t_s \cdot R_{low}$

If $R_{low} < R < R_{high}$, then $\Delta_k = \Delta_{k-1}$

In certain embodiments, the reference offset or setpoint offset angle value $x_k$ is always set to zero so that the offset can be brought down to zero over time as a function of steering wheel speed and vehicle speed, i.e., so that the detected offset can be reduced to zero. Because $x_k$ is always set to zero, the following equations are obtained:

$$\frac{x_k - \Delta_{k-1}}{t_s} = \frac{x_k - (x_{k-1} - y_{k-1})}{t_s}$$

$$\frac{x_k - \Delta_{k-1}}{t_s} = \frac{(x_k - x_{k-1}) + y_{k-1}}{t_s}$$

$$\frac{x_k - \Delta_{k-1}}{t_s} = \frac{y_{k-1}}{t_s}$$

The production of a new offset angle value thus can take the following form:

$\Delta_k = \Delta_{k-1} + t_s * R_{high}$ if $R > R_{high}$ $\Delta_k = \Delta_{k-1} + t_s * R_{low}$ if $R > R_{low}$ $\Delta_k = x_k = 0$ if $R_{low} < R < R_{high}$ According to the above equations, the offset angle value is updated at every sample step because the offset angle value is reduced at every time step when possible. In accordance with certain embodiments of the present teachings, the algorithm above in the SOC 30 illustrated in FIG. 1.

Figure 4:
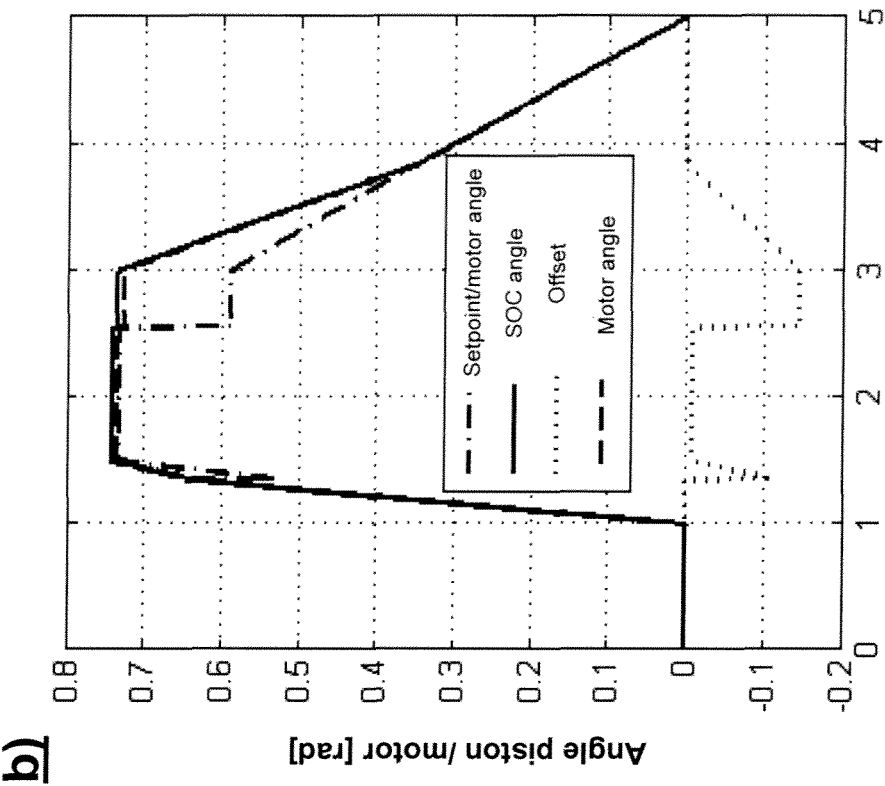
FIGS. 4A and 4B illustrate an example of a wheel steer angle that arises during execution of an algorithm in accordance with the present teachings.
Figure 4:
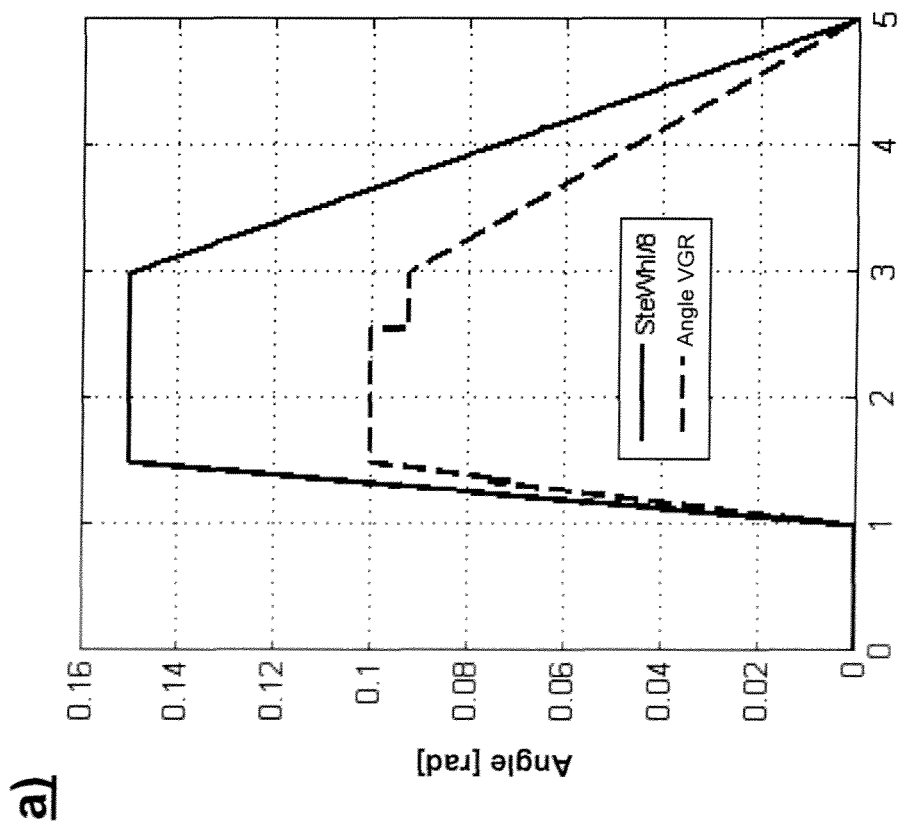

FIGS. 4A and 4B illustrate an example of how the wheel steer angle (SteWhl/8) can change when the driver selects a different mode of steering (e.g., from sport to comfort) and an associated variable gear ratio (Angle VGR) changes.

FIG. 4A illustrates a jump in a desired road wheel angle (dotted line) caused by a change in steering ratio desired by the driver. But, the steering wheel angle (SteWhl/8, reduced by a factor of eight in the plot) does not correspondingly change as desired. If an algorithm in accordance with the present teachings was not utilized, the steering wheel angle would have jumped with the dotted line.

The offset angle (i.e., the difference between the demanded motor angle and the measured motor angle) can be captured at the synchronization request and set as the current offset angle to reduce the offset angle. The change in the motor angle, offset angle, and setpoint motor angle are plotted in FIG. 4B.

FIG. 4B illustrates, for the scenario of FIG. 4A, how the offset angle is reduced when the driver steers back to the center point. FIG. 4B also shows the correct capture and storing of offset angle value. The first dip in the offset angle is due to system start-up and second dip is due to driver selection of new steering mode. The offset angle value can remain unchanged as long as driver does not do any steering change. When the driver starts to steer the offset angle can be reduced and a desired road steer angle can be achieved in a synchronised manner.

Other embodiments of the present teachings will be apparent to those skilled in the art from consideration of the specification and practice of the teachings disclosed herein. It is intended that the specification and examples be considered as exemplary only, with a true scope and spirit of the present teachings being indicated by the following claims.

What is claimed is:

1. A method for operating an active steering system of a vehicle, comprising:
   detecting an offset angle between a requested motor angle and an actual motor angle of a motor; and
   reducing the offset angle by actuating the motor using a reduction rate selected as a function of at least one input variable specified by a driver of the vehicle,
   wherein detecting and reducing the offset angle occur only upon receipt of an external synchronization request.

2. The method of claim 1, wherein the at least one input variable specified by the driver comprises one or more of a steering wheel speed and a wheel steer angle.

3. The method of claim 1, wherein reducing the offset angle comprises reducing the offset angle in a manner that is synchronized with a steering operation of the driver.

4. The method of claim 1, further comprising receiving an external synchronization request at a state decision module.

5. The method of claim 4, further comprising outputting state information to an offset arbitration module.

6. The method of claim 5, further comprising calculating a modified demanded motor angle based on the state information.

7. A method for operating an active steering system of a vehicle, comprising:
   modifying a ratio between a wheel steer angle and a driver-specified steering wheel angle by superimposing a superimposition angle on the ratio when operating a motor of active steering system, a setpoint value for the superimposition angle being based on an external request for detection of an offset angle,
   wherein, when there is no external request, the setpoint value is set to a demanded motor angle, and
   wherein, when there is an external request, the setpoint value is set to a modified demanded motor angle.

8. The method of claim 7, wherein the modified demanded motor angle is equal to the demanded motor angle minus the offset angle.

9. The method of claim 8, wherein the offset angle is multiplied by a factor dependent on a steering wheel speed and/or a wheel steer angle.

* * * * *